UNITED STATES PATENT OFFICE.

E. G. PERRY, OF KNOXVILLE, ILLINOIS.

IMPROVED MEDICAL COMPOUND.

Specification forming part of Letters Patent No. 54,944, dated May 22, 1866.

*To all whom it may concern:*

Be it known that I, E. G. PERRY, of Knoxville, in the county of Knox, State of Illinois, have invented a new and Improved Medical Compound; and I do hereby declare that the following is a full, clear, and exact description thereof, which will enable others skilled in the art to make and use the same.

This invention relates to a compound which is particularly intended for the cure of and prevention of hog-cholera.

My compound is made of unslaked lime, sal-soda, ground mandrake-root, ground garget-root, saltpeter, copperas, ground ginger, and sulphur, which are mixed together in about the following proportions: unslaked lime, two pounds; sal-soda, one pound; mandrake-root, six ounces; garget-root, six ounces; saltpeter, six ounces; copperas, six ounces; ginger, six ounces; sulphur, six ounces. All the ingredients are reduced to fine powder and put together in an earthen vessel. Then I pour on two gallons of boiling water and cover it up to prevent the aroma from escaping with the steam. When cool I add eight ounces of tincture of asafetida.

Dose: In an ordinary case, three ounces given in a quart of slop every six hours for three or four doses. In severe cases increase the dose at discretion. If the hog refuses to eat dilute the mixture with half a pint of slop and give as a drench.

What I claim as new, and desire to secure by Letters Patent, is—

The within-described compound, made of the ingredients set forth, and mixed together substantially in the manner specified.

The above specification of my invention signed by me this 5th day of March, 1866.

E. G. PERRY.

Witnesses:
 WILLIAM HESTER,
 C. RUNKLE.